US 6,635,877 B2

(12) United States Patent
Kusuyama et al.

(10) Patent No.: US 6,635,877 B2
(45) Date of Patent: Oct. 21, 2003

(54) SCINTILLATOR PANEL, RADIATION IMAGE SENSOR, AND METHOD OF MAKING SCINTILLATOR PANEL

(75) Inventors: Yutaka Kusuyama, Hamamatsu (JP); Katsutoshi Nonaka, Hamamatsu (JP)

(73) Assignee: Hamamatsu Photonics K.K., Shizuoka (JP)

( * ) Notice: Subject to any disclaimer, the term of this patent is extended or adjusted under 35 U.S.C. 154(b) by 231 days.

(21) Appl. No.: 09/929,490

(22) Filed: Aug. 15, 2001

(65) Prior Publication Data
US 2001/0054694 A1 Dec. 27, 2001

Related U.S. Application Data

(63) Continuation-in-part of application No. PCT/JP00/02640, filed on Apr. 21, 2000.

(30) Foreign Application Priority Data
Apr. 22, 1999 (JP) ............................................. 11-114941

(51) Int. Cl.[7] ................................................ G01T 1/20
(52) U.S. Cl. ............... 250/367; 250/370.11; 250/361 R
(58) Field of Search ...................... 290/370.11, 370.01, 290/208.1, 361 R, 362, 366, 367

(56) References Cited

U.S. PATENT DOCUMENTS

| 5,563,414 A | 10/1996 | Sklebitz | 250/368 |
| 5,572,034 A | 11/1996 | Karellas | 250/368 |
| 6,479,827 B1 * | 11/2002 | Hammamoto et al. | 250/370.11 |

FOREIGN PATENT DOCUMENTS

| EP | 0 666 483 A2 | 8/1995 |
| JP | 63-311193 | 12/1988 |
| JP | 5-11060 | 1/1993 |
| JP | 8-211155 | 8/1996 |

OTHER PUBLICATIONS

ThreeBond Technical News, No. 39, Sep. 23, 1992, pp. 1–10.
William F. Gorham, "A New General Synthetic Method for the Preparation of Linear Poly–p–xylylenes," Journal of Polymer Science: Part A–1, vol. 4, 1966, pp. 3027–3039.

* cited by examiner

Primary Examiner—Constantine Hannaher
Assistant Examiner—Timothy Moran
(74) Attorney, Agent, or Firm—Morgan, Lewis & Bockius LLP

(57) ABSTRACT

A radiation image sensor 10 comprises two optical members 12, 14; a scintillator 18 deposited on entrance end faces 12a, 14a of the optical members 12, 14; a plurality of light-guiding optical components 22; and a plurality of CCDs 20. Each of the optical members 12, 14 is an optical member in which several millions/cm$^2$ of optical fibers are disposed parallel to each other and integrally molded, whereas the optical fibers have an axis forming an acute angle with the entrance end face 12a, 14a. The two optical members 12, 14 are arranged such that the optical fibers respectively constituting each of the optical members 12, 14 have a gap therebetween widening from the entrance end face 12a, 14a side to the exit end face 12b, 14b side. Respective side faces 12c, 14c of optical members 12, 14 are formed with ground surfaces 12d, 14d in which the respective side faces 12c, 14c of optical members 12, 14 are ground against each other.

13 Claims, 7 Drawing Sheets

SCINTILLATOR PANEL, RADIATION IMAGE SENSOR, AND METHOD OF MAKING SCINTILLATOR PANEL

RELATED APPLICATION

The present application is a continuation-in-part application of PCT application No. PCT/JP00/02640 filed on Apr. 21, 2000, designating U.S.A. and now pending.

BACKGROUND OF THE INVENTION

1. Field of the Invention

The present invention relates to a scintillator panel, a radiation image sensor, and a method of making a scintillator panel.

2. Related Background Art

Needs for radiation image sensors for detecting and capturing radiation images rapidly with high accuracy have been increasing in the fields of medicine, industry, and the like. For responding to these needs, a radiation image sensor comprising a scintillator for converting a radiation image to an optical image, an imaging device for capturing this optical image, and an optical fiber bundle for guiding to the imaging device the optical image outputted from the scintillator has been known, for example. Also known is a radiation image sensor which, in order to capture a relatively large radiation image, employs a plurality of optical fiber bundles so for guiding to a plurality of imaging devices the optical image outputted from the scintillator, and uses the plurality of imaging devices so as to capture the image.

On the other hand, Japanese Patent Application Laid-Open No. HEI 8-211155, for example, discloses a radiation image sensor in which an optical fiber bundle whose optical fiber axis forms an acute angle with the entrance end face is arranged such that the gaps between optical fibers widen from the entrance end face side to the exit end face side while their edges on the entrance end face side abut against each other. When such a radiation image sensor is used, the dead space of optical fiber bundle on the entrance end face side becomes quite smaller, whereby radiation images are prevented from partly dropping off.

SUMMARY OF THE INVENTION

However, the radiation image sensors in accordance with the above-mentioned prior art have the following problem. Namely, for carrying out imaging with high accuracy in a radiation image sensor, it is necessary to polish the entrance end face of optical fiber bundle in order to enhance its planarity. Here, in the above-mentioned radiation image sensor in which the optical fiber bundle is arranged such that edges on the entrance end face side abut against each other, edge portions are likely to chip off when the entrance end face is polished. As a consequence, a dead space occurs in the chipped-off part, whereby drops may occur in radiation images.

Therefore, it is an object of the present invention to overcome the above-mentioned problem and provide a radiation image sensor having a very small dead space and enabling highly accurate imaging, a scintillator panel used therein, and a method of making the scintillator panel.

For overcoming the above-mentioned problem, the scintillator panel of the present invention comprises an optical component in which a plurality of optical members, each having entrance and exit end faces substantially parallel to each other and being composed of a plurality of optical fibers arranged, are arranged such that the entrance end faces are disposed on substantially the same plane and side faces adjacent each other are bonded with an adhesive; and a scintillator deposited on the entrance end faces arranged; wherein at least one of the optical members adjacent each other has an optical fiber axis forming an acute angle with the entrance end face; wherein each of the optical members adjacent each other is arranged such that the optical fibers respectively constituting each of the optical members have a gap therebetween widening from the entrance end face side to the exit end face side; and wherein each side face of the optical members adjacent each other on the entrance end face side is formed with a ground surface in which the optical members are ground against each other.

Since optical members which have an optical fiber axis forming an acute angle with the entrance end face are arranged such that the gap between optical fibers widens from the entrance end face side to the exit end face side, and are bonded in a state where they are ground against each other on the entrance side, the dead space occurring at the boundary face between optical members can be made extremely small. Further, since the ground surface is formed on the side face on the entrance end face side, the entrance end face does not chip off even when polished, whereby dead spaces can be prevented from occurring due to the chipping-off. Therefore, highly accurate radiation images can be outputted.

Also, for overcoming the above-mentioned problem, the radiation image sensor of the present invention comprises the above-mentioned scintillator panel, and an imaging device for capturing an optical image outputted from the exit end face of the optical member.

The dead space occurring at the boundary face between optical members can be made extremely small by use of the above-mentioned scintillator panel, and the optical image outputted from the exit end face of optical members can be captured since the imaging device is provided. As a result, highly accurate radiation images can be captured.

Also, for overcoming the above-mentioned problem, the method of making a scintillator panel in accordance with the present invention is a method of making a scintillator panel in which a plurality of optical members, each having entrance and exit end faces substantially parallel to each other and being composed of a plurality of optical fibers arranged, are arranged such that the entrance end faces are disposed on substantially the same plane, and a scintillator is deposited on the entrance end faces arranged; the method comprising: a processing step of processing the optical members such that an axis of the optical fibers forms an acute angle with the entrance end face; an arrangement step of arranging each of the optical members adjacent each other such that the optical fibers respectively constituting each of the optical members have a gap therebetween widening from the entrance end face side to the exit end face side; a grinding step of grinding respective side faces of the optical members adjacent each other against each other so as to form a ground surface on each of the respective side faces of the optical members adjacent each other on the entrance end face side; a bonding step of bonding with an adhesive the side faces adjacent each other; and a depositing step of depositing a scintillator on the entrance end faces arranged.

Since optical members which have an optical fiber axis forming an acute angle with the entrance end face are arranged such that the gap between optical fibers widens from the entrance end face side to the exit end face side, and are bonded in a state where they are ground against each other on the entrance side, the dead space occurring at the boundary face between optical members can be made extremely small. Further, since the ground surface is formed on the side face on the entrance end face side, the entrance end face does not chip off even when polished, whereby dead spaces can be prevented from occurring due to the chipping-off. As a result, a scintillator panel which can output highly accurate radiation images can be made.

DESCRIPTION OF THE PREFERRED EMBODIMENTS

Figure 1:
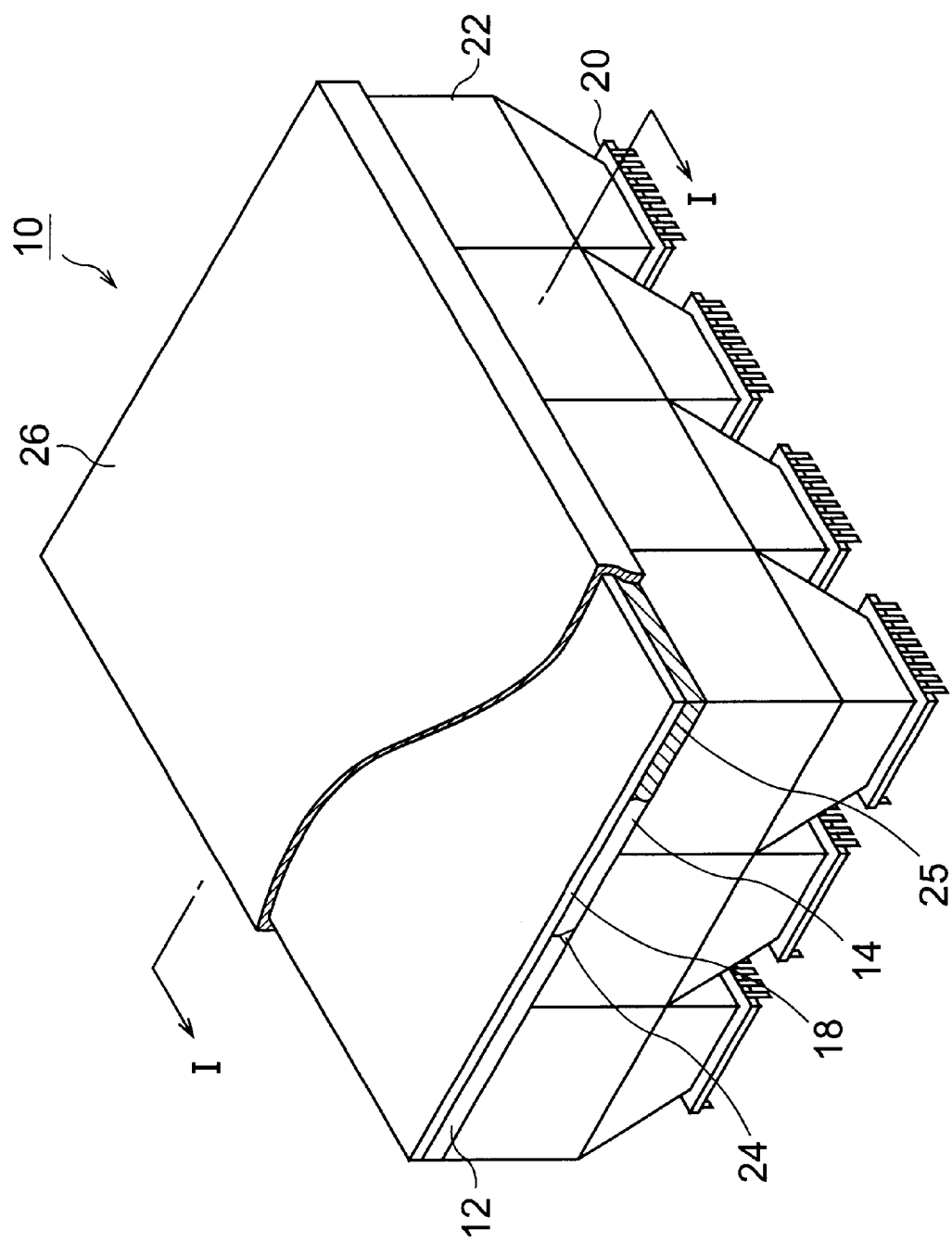
FIG. 1 is a partly cutaway perspective view of a radiation image sensor.
Figure 2:
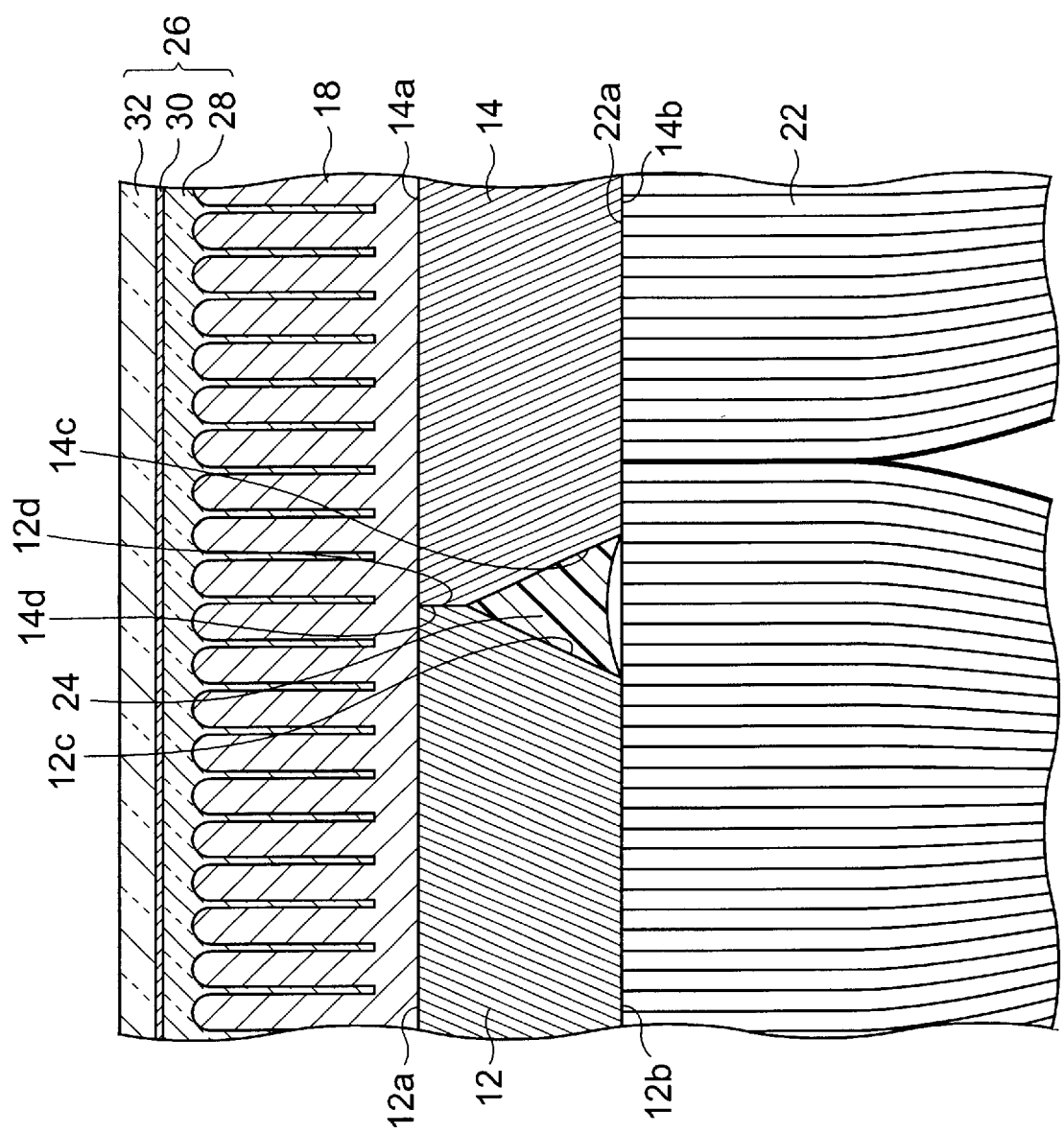
FIG. 2 is an enlarged sectional view taken along the line I—I of FIG. 1.
Figure 3:
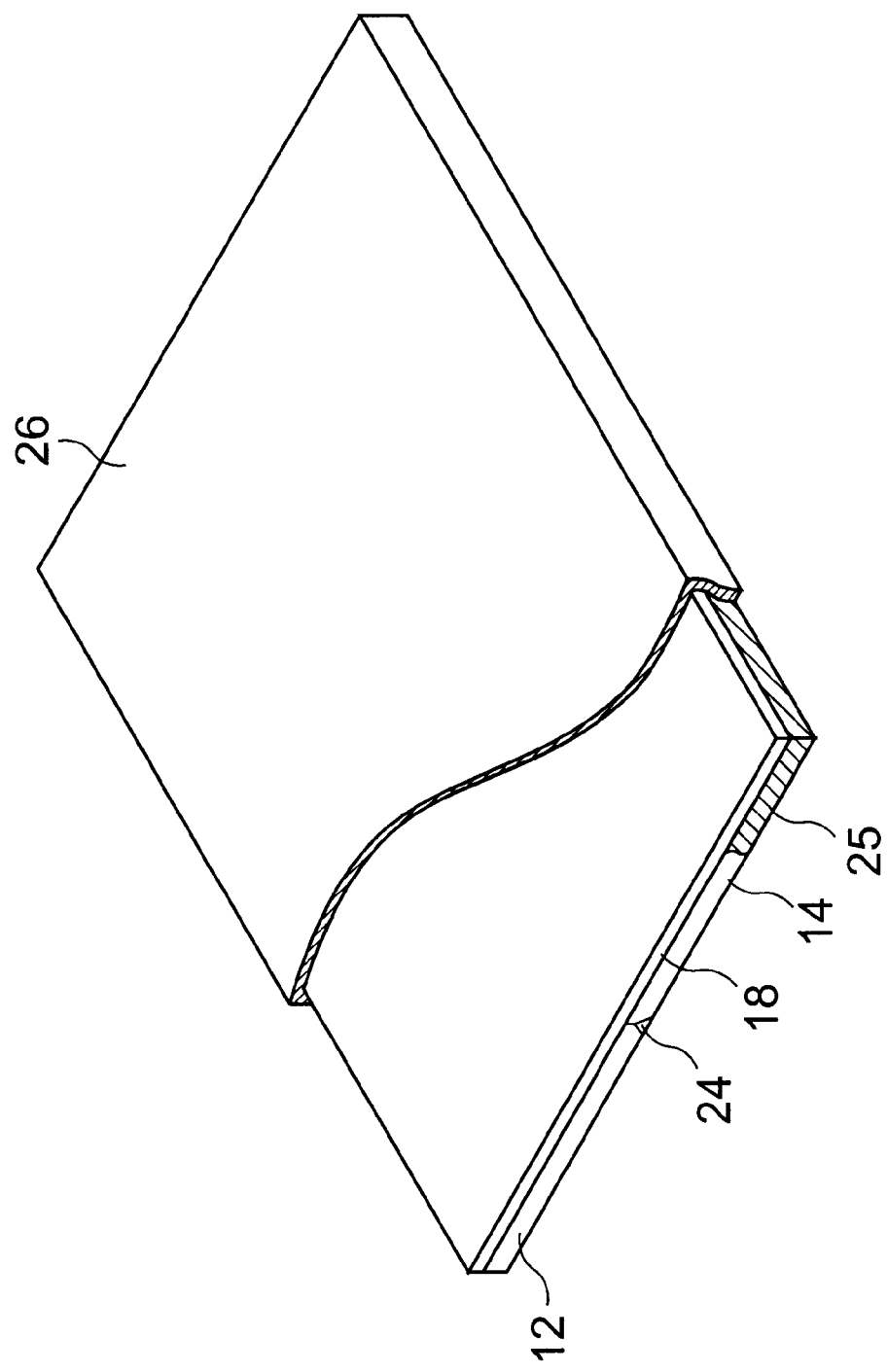
FIG. 3 is a partly cutaway perspective view of a scintillator panel.

The radiation image sensor in accordance with an embodiment of the present invention will be explained with reference to the drawings. Here, the scintillator panel of the present invention is included in the radiation image sensor in accordance with this embodiment, and is seen as shown in FIG. 3 when represented separately from the radiation image sensor in accordance with this embodiment. First, the configuration of the radiation image sensor in accordance with this embodiment will be explained. FIG. 1 is a partly cutaway perspective view of the radiation image sensor in accordance with this embodiment, whereas FIG. 2 is an enlarged sectional view taken along the line I—I of FIG. 1.

As shown in FIG. 1, the radiation image sensor 10 in accordance with this embodiment comprises an optical component in which two optical members 12, 14 are arranged such that their entrance end faces 12a, 14a are disposed on substantially the same plane; a scintillator 18 deposited (grown) on the entrance end faces 12a, 14a of optical members 12, 14; a plurality of CCDs 20 (imaging devices) for capturing optical images outputted from exit end faces 12b, 14b of the optical members 12, 14; and a plurality of light-guiding optical components 22 for guiding to the CCDs 20 the optical images outputted from the exit end faces 12b, 14b of optical members 12, 14. They will be explained in detail in the following.

Since the optical members 12, 14 have forms similar to each other, only the optical member 12 will be explained in the following. The optical member 12 is constituted by several millions/cm² of optical fibers (having a diameter of about 6 μm) arranged parallel to each other and molded integrally, and has an entrance end face 12a and an exit end face 12b which are substantially parallel to each other. Namely, an optical image incident on the entrance end face 12a propagates through each of the optical fibers constituting the optical member 12, so as to be outputted from the exit end face 12b. Here, as shown in FIG. 12, the optical fiber axis forms an acute angle with the entrance end face 12a and exit end face 12b. More specifically, the angle formed between the normal of entrance end face 12a and exit end face 12b and the optical fiber axis is about 0.1 to 2°.

Each of the entrance end face 12a and exit end face 12b of optical member 12 is shaped like a rectangle having a shorter side of about 94 mm and a longer side of about 270 mm, whereas the distance between the entrance end face 12a and exit end face 12b is about 4 mm. As a consequence, the optical member 12 has a flat form having a rectangular bottom face of about 94 mm×270 mm and a thickness of about 4 mm.

The two optical members 12, 14 are arranged such that the entrance end faces 12a, 14a are disposed on substantially the same plane. More specifically, while the two optical members 12, 14 are arranged such that their side faces 12c, 14c on the longer side adjoin each other, the optical fibers respectively constituting the optical members 12, 14 have a gap therebetween widening from the entrance end face 12a, 14a side to the exit end face 12b, 14b side as shown in FIG. 2.

Also, the respective side faces 12c, 14c of the optical members 12, 14 adjacent each other are formed with ground surfaces 12d, 14d in which the respective side faces 12c, 14c of optical members 12, 14 are ground against each other on their entrance end face 12a, 14a side.

The side faces 12c, 14c of two optical members 12, 14 adjacent each other are bonded and secured to each other with an adhesive 24. Employed as the adhesive 24 here is one which can absorb light occurring within the scintillator 18 and entering the adhesive 24. In particular, one which can absorb at least 50% of the light occurring within the scintillator 18 and entering the adhesive 24 is preferable. As an example of such adhesive 24, EPO-TEK353ND (product name) manufactured by EPOXY TECHNOLOGY, Inc., and the like can be used.

The entrance end faces 12a, 14a can be integrated with each other when the two optical members 12, 14 are arranged as mentioned above. More specifically, the two optical members 12, 14 are arranged and bonded together, and their outer peripheral face is polished, whereby an entrance end face having a large area of about 186 mm×248 mm is formed. Here, it is conceivable to form an optical members having a large area of entrance end face from the beginning by integrally molding a massive amount of optical fibers. However, as the area of entrance end face of the optical member to be integrally molded increases, the control of its homogeneity or the like becomes increasingly difficult. Therefore, the method in which a plurality of optical members each having a relatively small area of entrance end face are arranged so as to form a large area of entrance end face is quite practical and economical.

In the side faces 12c, 14c of two optical members 12, 14, the parts of side faces 12c, 14c not adjacent each other, i.e., those exposed outside, are coated with a light-shielding material 25 having a light transmissivity of 50% or less (illustrated as being partly cut away in FIG. 1 (and FIG. 3)).

On the entrance end faces 12a, 14a integrated upon arranging the two optical members 12, 14, the scintillator 18 adapted to emit visible light when radiation such as X-rays is made incident thereon is formed by vapor-phase growth. The scintillator 18 is formed from CsI as an arrangement of columnar structures extending by about 600 μm in a substantially vertical direction from the entrance end faces 12a, 14a.

Formed on the scintillator 18 is a protective film 26 for physically protecting the scintillator 18 and preventing CsI forming the scintillator 18 from deliquescing. The protective film 26 has a three layer in which a first layer 28 (moisture-resistant protective layer), a second layer 30, and a third layer 32 are successively stacked on the scintillator 18. More specifically, the protective film 26 is formed not only on the scintillator 18 but also so as to cover the side faces of scintillator 18 and the side faces 12c, 14c of optical members 12, 14.

The first layer 28 is made of polyparaxylylene resin and is formed so as to come into contact with the scintillator 18. More specifically, it is formed so as to fill the interstices among the columnar structures of CsI and further grow by about 10 $\mu$m from the top portion of columnar structures. As such polyparaxylylene resin, there are Parylene (product name) manufactured by Three Bond Co., Ltd., and the like. Polyparaxylylene resin has excellent characteristics suitable for protecting the scintillator 18 in that steam and gases can hardly transmit therethrough, it has a high water-repellency and chemical resistance, it is highly electrically insulative even in a thin film, it is transparent to radiation and visible rays, and so forth.

Details of coating with polyparaxylylene are described in Threebond Technical News (issued on Sep. 23, 1992), and its characteristic features will be explained here.

As in vacuum vapor deposition of a metal, coating with polyparaxylylene can be effected by chemical vapor deposition (CVD) method in which it is vapor-deposited on a substrate in vacuum. This method comprises a step of pyrolyzing diparaxylylene monomer and rapidly cooling the resulting product in an organic solvent such as toluene or benzene so as to yield diparaxylylene known as dimer; a step of pyrolyzing this dimer so as to generate a stable radical paraxylylene gas; and absorbing and polymerizing the generated gas on a material so as to form a polyparaxylylene film having a molecular weight of about 500,000 upon polymerization.

There are two major differences between polyparaxylylene vapor deposition and metal vapor deposition. Namely, the pressure at the time of polyparaxylylene vapor deposition is 13.3 to 26.7 Pa (0.1 to 0.2 Torr) and thus is higher than the pressure of 0.133 Pa (0.001 Torr) in the case of metal vapor deposition, and the accommodation coefficient of polyparaxylylene vapor deposition is lower than the accommodation coefficient 1 of metal vapor deposition by two to four digits. Therefore, at the time of vapor deposition, a monomolecular polyparaxylylene covers the whole object to be coated, and then polyparaxylylene is deposited thereon. Consequently, a thin film having a thickness as small as 0.2 $\mu$m can be formed with a uniform thickness in a state without pinholes, whereby acute angle portions, edge portions, and narrow gaps of micron order, which have been unable to be coated in a liquid state, can be coated. Also, since coating at a temperature near the room temperature is possible without necessitating heat treatment and the like at the time of coating, neither mechanical stress nor thermal distortion occurs upon curing, whereby it is also excellent in the stability of coating. Further, almost all solid materials can be coated therewith.

The second layer 30 is made of Al, and is formed with a thickness of about 0.25 $\mu$m on the first layer 28. Since Al has a property of transmitting radiation therethrough and reflecting visible light, it prevents the light generated in the scintillator 18 from leaking out therefrom, whereby the sensitivity of radiation image sensor 10 can be improved.

The third layer 32 is made of polyparaxylylene resin as with the first layer 28, and is formed with a thickness of about 10 $\mu$m on the second layer 30. While Al forming the second layer 30 is easy to corrode in the air, Al is protected against corrosion since the second layer 30 is held between the first layer 28 and third layer 32 made of polyparaxylylene resin.

As with the optical member 12 and the like, the light-guiding optical component 22 is constituted by several million/cm$^2$ of optical fibers arranged parallel to each other and integrally molded, and has an entrance end face 22a and an exit end face 22b which intersect the axis of optical fibers. The light-guiding optical component 22 has a taper form in which the exit end face 22b is smaller than the entrance end face 22a. Consequently, the optical image incident on the entrance end face 22a propagates through each of the optical fibers constituting the light-guiding optical component 22, so as to be outputted from the exit end face 22b under demagnification.

Each of the entrance end faces 22a of the light-guiding optical components 22 is in contact with the exit end faces 12b, 14b of optical members 12, 14. Here, the light-guiding optical components 22 may not be disposed so as to correspond to the respective exit end faces 12b, 14b of optical members 12, 14, but to respective areas into which the exit end face 12b, 14b integrated by arranging the two optical members 12, 14 is arbitrarily divided. In the radiation image sensor 10 in accordance with this embodiment, the exit end face 12b, 14b integrated by arranging the two optical members 12, 14 is divided into 12 areas in total composed of 3 in the longitudinal direction and 4 in the lateral direction, whereas one light-guiding optical component 22 is disposed in each area. Therefore, 12 light-guiding optical components 22 in total are provided.

To the exit end face 22b of each light-guiding optical component 22, a CCD 20 is connected. Consequently, the radiation image sensor 10 in accordance with this embodiment comprises 12 CCDs 20.

Figure 4A:
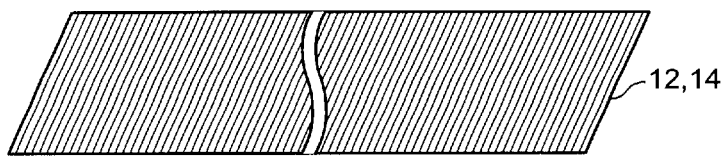
FIGS. 4A to 4F are views showing manufacturing steps of the radiation image sensor.
Figure 4B:
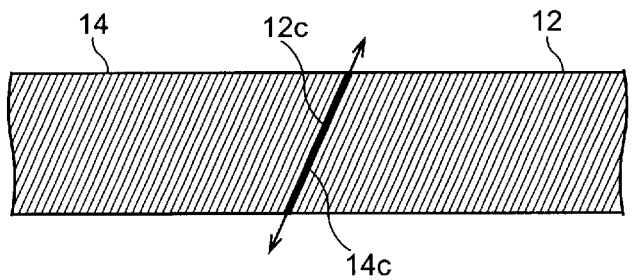

A method of making a radiation image sensor in accordance with an embodiment of the present invention will now be explained. FIGS. 4A to 4F are views showing manufacturing steps of the radiation image sensor 10 in accordance with this embodiment. Initially, for making the radiation image sensor 10, the optical members 12, 14 are processed such that the optical fiber axis forms an acute angle with the entrance end faces 12a, 14a as shown in FIG. 4A. Specifically, an optical member formed by arranging a plurality of optical fibers is sliced obliquely with respect to the optical fiber axis, whereby the optical members 12, 14 are formed. Thereafter, each of the side faces 12c, 14c of optical members 12, 14 is polished with an abrasive having an average particle size of 9.5 $\mu$m, and the side faces 12c, 14c of optical members 12, 14 are totally ground against each other as shown in FIG. 4B.

Figure 4C:
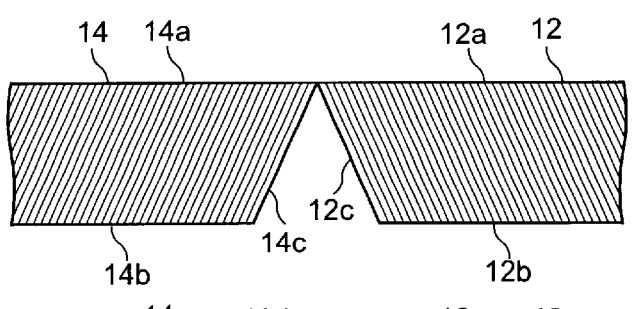
Figure 5:
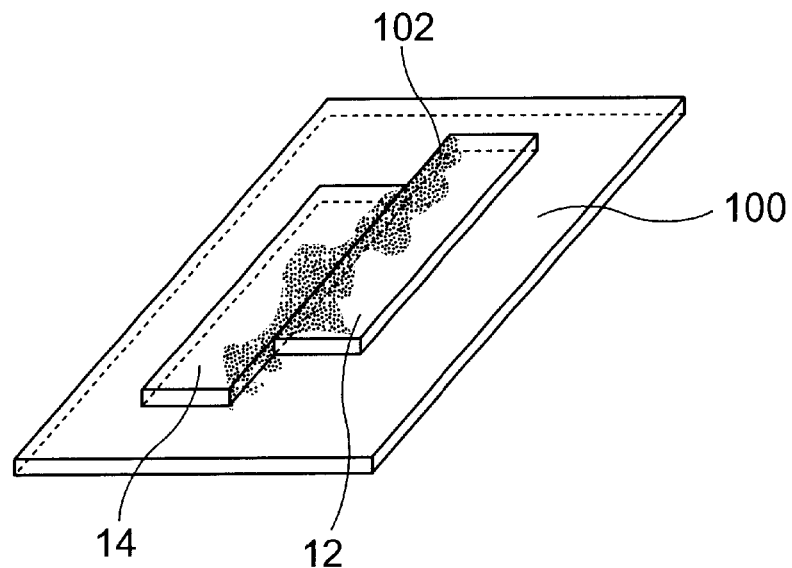
FIG. 5 is a view showing a manufacturing step of the radiation image sensor.

Subsequently, as shown in FIG. 4C, the optical members 12, 14 are arranged such that the optical fibers respectively constituting each of the optical members 12, 14 have a gap therebetween widening from the entrance end face 12a, 14a side to the exit end face 12b, 14b side. More specifically as shown in FIG. 5, on a table 100 coated with an abrasive (not depicted) having an average particle size of 9.5 $\mu$m, the optical members 12, 14 are disposed such that the edge of side face 12c of optical member 12 and the edge of side face 14c of optical member 14 oppose each other. Also, an abrasive 102 having an average particle size of 9.5 $\mu$m is inserted into the gap between the side face 12c of optical member 12 and the side face 14c of optical member 14.

Figure 4D:
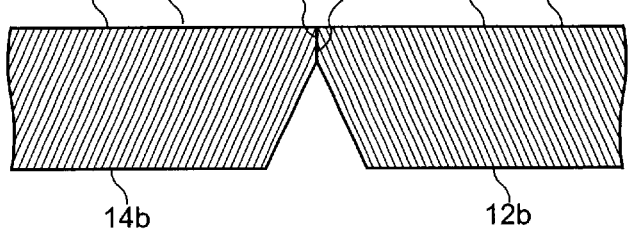
Figure 6A:
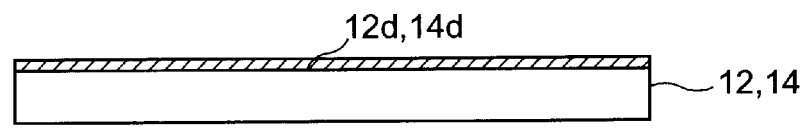
FIGS. 6A to 6E are views showing forms of ground surfaces.
Figure 6B:
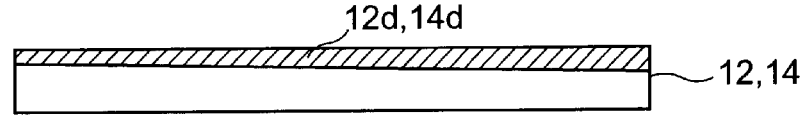
Figure 6C:
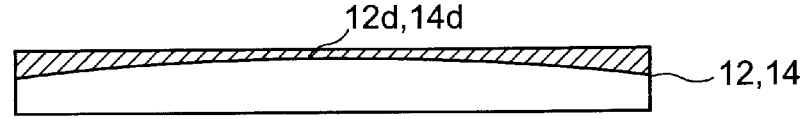
Figure 6D:
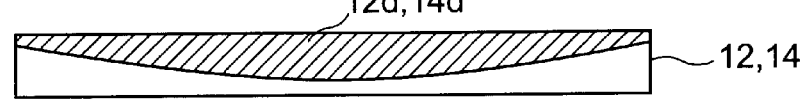
Figure 6E:
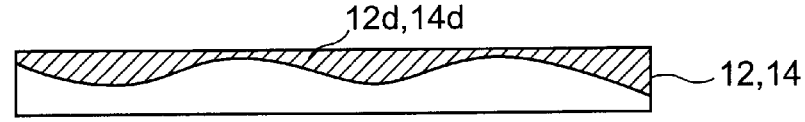

Subsequently, in the state mentioned above, the side face 12c of optical member 12 and the side face 14c of optical member 14 are ground against each other, whereby the side faces 12c, 14c of optical members 12, 14 are formed with ground surfaces 12d, 14d on their entrance end face 12a, 14a side, respectively, as shown in FIG. 4D. At this point, it is preferred that the ground surfaces 12d, 14d have a width of at least 0.1 mm from the entrance end face 12a, 14a side to the exit end face 12b, 14b side. This aims at securing a polishing margin when polishing the entrance end face 12a, 14a in a later step. Though it is preferred that the ground surfaces 12d, 14d be formed uniform in the longitudinal direction of side faces 12c, 14c of optical members 12, 14 as shown in FIG. 6A from the viewpoint of thinning the layer of adhesive material 24, the ground surfaces 12d, 14d may also have forms shown in FIGS. 6B to 6E as long as the ground surfaces 12d, 14d are continuously formed in the longitudinal direction of side faces 12c, 14c of optical members 12, 14. After the ground surfaces 12d, 14d are formed, the abrasive 102 is washed out, the optical members 12, 14 are entirely washed with running water, and then the remaining moisture is blown away with an airgun. Thereafter, they are baked at a temperature of 500° C. for about 1 hour, so as to eliminate the organic matters attached to the surface.

Figure 4E:
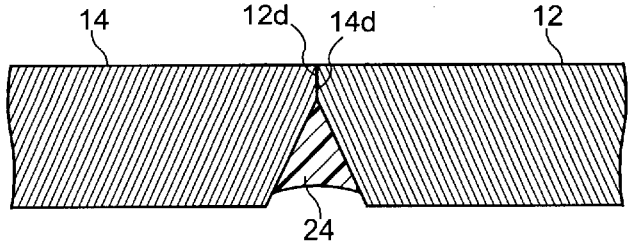

Subsequently, as shown in FIG. 4E, the side faces 12c, 14c of optical members 12, 14 are bonded to each other with the adhesive 24. Specifically, it is carried out as follows. Namely, the optical members 12, 14 are arranged on a bonding pedestal such that the side faces 12c, 14c oppose each other. Thereafter, the upper face of the boundary portion between the optical members 12 and 14 is coated with the adhesive 24 by a width of about 2 mm. When the adhesive 24 has flowed into the gap between the optical members 12 and 14, a pressure is laterally applied to each of the optical members 12 and 14, so as to gradually narrow the gap between the optical members 12 and 14. Here, the adhesive 24 is uniformly spread, so as to leave no bubbles in the adhesive 24. When the gap between the optical members 12 and 14 is sufficiently narrowed, a weight is placed on the optical members 12 and 14, so as to initially cure the adhesive (4 hours at 40° C. and 1.5 hours at 80° C.). After the initial curing, the width of bonded portion, whether there is chipping-off or not, and so forth are verified. If the width of bonded portion is appropriate and there is no chipping-off, then the adhesive 24 is finally cured (1 hour at 250° C.).

Figure 4F:
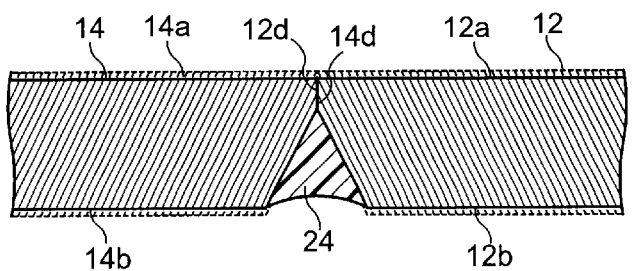

Subsequently, as shown in FIG. 4F, the entrance end faces 12a, 14a and exit end faces 12b, 14b of optical members 12, 14 are polished. Thereafter, the scintillator 18 is deposited on the entrance end faces 12a, 14a by vapor-phase growth, and the protective film 26 is formed thereon. Also, the light-guiding optical components 22 and CCDs 20 are connected to the optical members 12, 14 on the exit end face 12b, 14b side, whereby the radiation image sensor 10 is accomplished.

Operations and effects of the radiation image sensor in accordance with this embodiment will now be explained. When a radiation image is incident on the scintillator 18, an image of visible light (hereinafter referred to as optical image) corresponding to the incident radiation image is generated within the scintillator 18 according to the radiation/visible light converting effect of CsI.

The optical image generated within the scintillator 18 enters the optical members 12, 14 from their entrance end faces 12a, 14a, and propagates through the optical members 12, 14, so as to be emitted from their exit end faces 12b, 14b.

The optical image emitted from the exit end faces 12b, 14b of optical members 12, 14 is divided into a plurality of parts (12 parts in this embodiment), so as to be made incident on the respective entrance end faces 22a of the light-guiding optical components 22 disposed at their corresponding positions.

The divided optical images incident on the entrance end faces 22a of light-guiding optical components 22 are respectively demagnified by actions of the light-guiding optical components 22, and then are emitted from the exit end faces 22b of light-guiding optical components 22, so as to be captured by the respective CCDs 20 connected to the exit end faces 22b of light-guiding optical components 22. Thereafter, the respective images captured by the CCDs 20 are rearranged by image processing and the like, whereby the captured image of incident radiation image can be obtained.

Here, in the radiation image sensor 10 in accordance with this embodiment, since the optical members 12, 14 having an optical fiber axis forming an acute angle with the entrance end faces 12a, 14a are arranged such that the gap between the optical fibers widens from the entrance end face 12a, 14a side to the exit end face 12b, 14b side, and the optical members 12, 14 are bonded together in the state where the side faces on the side of entrance end faces 12a, 14a are ground against each other, the dead space occurring at the boundary face between the optical members 12, 14 can be made extremely small. Further, since the ground surfaces are formed on the entrance end face 12a, 14a side, the entrance end faces 12a, 14a do not chip off even when the entrance end faces 12a, 14a are polished, whereby dead spaces can be prevented from occurring due to the chipping-off. As a result, the radiation image sensor enables highly accurate imaging with an extremely small dead space.

Figure 7A:
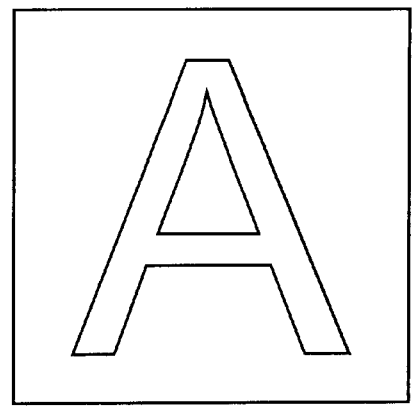
FIGS. 7A to 7C are views showing states of an optical image.
Figure 7B:
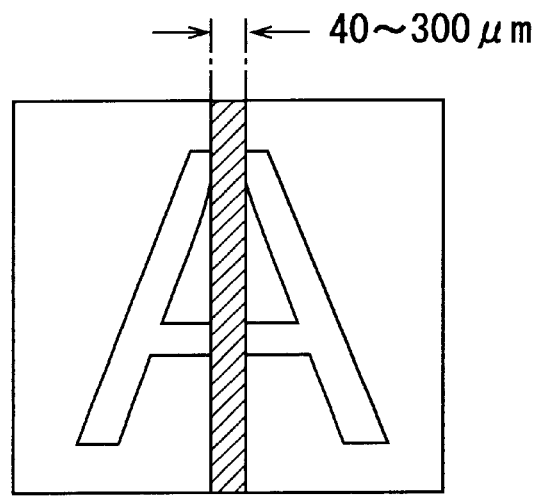
Figure 7C:
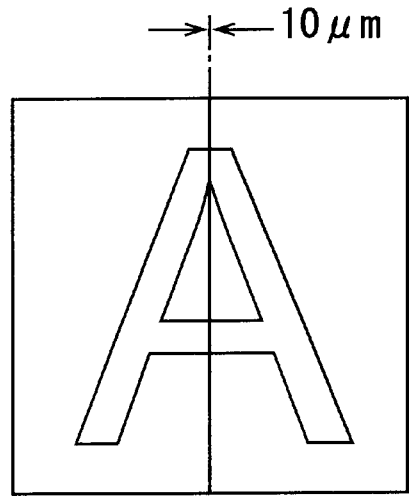

Specifically, when uniform ground surfaces 12d, 14d are formed as shown in FIG. 6A, the width of adhesive 24 (gap between the optical members 12 and 14) can be reduced to 2 to 4 μm without causing the entrance end faces 12a, 14a to chip off. In this case, the dead space occurring between the entrance end faces 12a and 14a is extremely small, i.e., 10 to 15 μm when optical fibers having a diameter of 6 μm are used, and 7 to 10 μm when optical fibers having a diameter of 3 μm are used. Here, when an optical image shown in FIG. 7A is incident on the entrance end faces 12a, 14a in the radiation image sensor 10, since the gap between the optical fibers widens from the entrance end face 12a, 14a side to the exit end face 12b, 14b side, a black band-like part (part without the incoming input image) extending about 40 to 300 μm occurs as shown in FIG. 7B in the boundary portion between the exit end faces 12b and 14b in the optical image outputted from the exit end faces 12b and 14b and captured by the CCDs 20. However, such a band-like part can easily be eliminated by image processing as shown in FIG. 7C, whereby the dropout portion of radiation image finally becomes extremely small, i.e., 10 μm or less (when optical fibers having a diameter of 3 μm are used).

Also, in the radiation image sensor 10 in accordance with this embodiment, the protective film 26, in which the first layer 28 made of polyparaxylylene resin, the second layer 30 made of Al, and the third layer made of polyparaxylylene resin are stacked, is disposed on the scintillator 18. Here, the first layer 28 made of polyparaxylylene eliminates steam and the like, so as to prevent CsI constituting the scintillator 18 from deliquescing, thereby favorably maintaining the radiation/light converting characteristic of scintillator 18. The second layer 30 made of Al confines the light generated within the scintillator 18 when the radiation is made incident on the latter, thus improving the detecting sensitivity of radiation image sensor 10. The third layer 32 made of polyparaxylylene resin eliminates steam and the like, thereby preventing Al constituting the second layer 30 from corroding.

Since the adhesive 24 absorbing at least 50% of incident light is used, the light incident on the adhesive 24 can be eliminated in the radiation image sensor 10 in accordance with this embodiment. Therefore, in the image captured by the CCDs 20, the part corresponding to the boundary portion between the exit end faces 12b and 14b is blackened, whereby this part can easily be eliminated from the captured image.

Since the side faces 12c, 14c of optical members 12, 14 exposed outside are formed with the light-shielding material 25 in the radiation image sensor 10 in accordance with this embodiment, light is prevented from being made incident on the optical members 12, 14 from the outside. As a result, the S/N ratio improves.

Since the radiation image sensor 10 in accordance with this embodiment is provided with the CCDs 20, the radiation image incident on the scintillator 18 can effectively be captured. Further, since the light-guiding optical components 22 are provided, the optical image emitted from the exit end faces 12b, 14b of optical members 12, 14 can efficiently be guided to the CCDs 20.

When the entrance end faces 12a, 14a and exit end faces 12b, 14b are polished in the radiation image sensor 10 in accordance with this embodiment, the planarity of entrance end faces 12a, 14a and exit end faces 12b, 14b can be enhanced, whereby captured images with a very high accuracy can be obtained.

Figure 8:
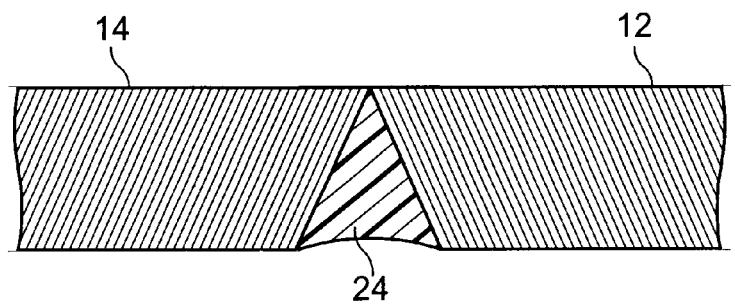
FIG. 8 is an enlarged sectional view of an optical component.

Though the ground surfaces 12d, 14d in which the respective side faces 12c, 14c of optical members 12, 14 are ground against each other are formed relatively large in the radiation image sensor 10, they may be made very small by polishing as shown in FIG. 8. Once the ground surfaces 12d, 14d are formed, the chipping-off can be prevented from occurring upon polishing.

Figure 9A:
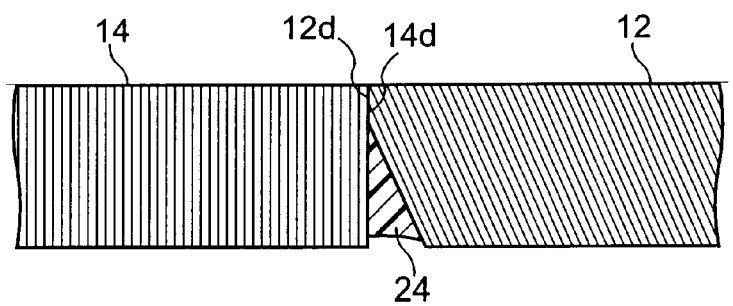
FIGS. 9A and 9B are enlarged sectional views of optical components.
Figure 9B:
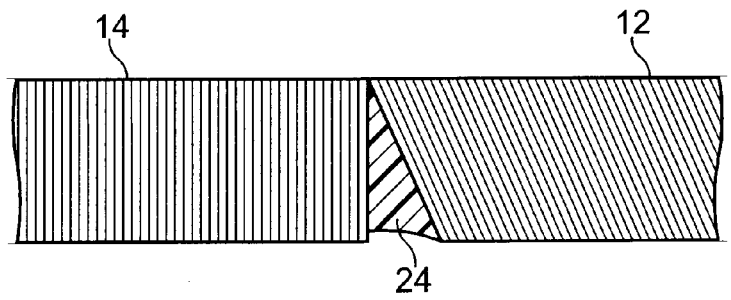

Both of the optical fiber axes of optical members 12, 14 form an acute angle with their corresponding entrance end faces 12a, 14a in the radiation image sensor 10 in accordance with the above-mentioned embodiment. However, while one of the optical fiber axes of optical members 12a, 14a forms an acute angle with the entrance end face 12a (or 14a), the other optical fiber axis may be perpendicular to the entrance end face 14a (or 12a) as shown in FIGS. 9A and 9B. Here, FIG. 9A is an example in which the ground surfaces 12d, 14d are formed relatively large, whereas FIG. 9B is an example in which the ground surfaces 12d, 14d are made very small by polishing. Such a configuration also makes the dead space extremely small, and enables highly accurate imaging.

Though two optical members 12, 14 are arranged so as to construct the radiation image sensor 10 in accordance with the above-mentioned embodiment, three or more optical members may be arranged therefor. When three or more optical members are arranged, larger radiation images can be captured.

Though the first layer 28 and third layer 32 constituting the protective film 26 are formed from polyparaxylylene resin in the radiation image sensor 10 in accordance with the above-mentioned embodiment, they may be formed from polyparachloroxylylene resin as well. The first layer 28 and third layer 32 can effectively prevent CsI from deliquescing and Al from corroding also when formed from polyparachloroxylylene resin. Here, an example of polyparachloroxylylene resin is Parylene C (product name) manufactured by Three Bond Co., Ltd.

Though the radiation image sensor 10 in accordance with the above-mentioned embodiment uses the scintillator 18 adapted to emit visible light when X-rays are incident thereon, it is not restrictive. For example, scintillators which emit ultraviolet rays when X-rays are incident thereon may also be used. In this case, radiation images can be captured by use of imaging devices sensitive to the wavelength region of ultraviolet light.

What is claimed is:

1. A scintillator panel comprising:
   an optical component in which a plurality of optical members, each having entrance and exit end faces substantially parallel to each other and being composed of a plurality of optical fibers arranged, are arranged such that said entrance end faces are disposed on substantially the same plane and said optical members adjacent each other are bonded with an adhesive; and
   a scintillator deposited on said entrance end faces arranged;
   wherein at least one of said optical members adjacent each other has an optical fiber axis forming an acute angle with said entrance end face;
   wherein each of said optical members adjacent each other is arranged such that said optical fibers respectively constituting each of said optical members have a gap therebetween widening from said entrance end face side to said exit end face side; and
   wherein each side face of said optical members adjacent each other on said entrance end face side is formed with a contact surface.

2. A scintillator panel according to claim 1, wherein a protective film is formed on said scintillator.

3. A scintillator panel according to claim 2, wherein said protective film includes a moisture-resistant protective layer which is made of polyparaxylylene and formed so as to come into contact with said scintillator.

4. A scintillator panel according to claim 2, wherein said protective film includes a moisture-resistant protective layer which is made of polyparachloroxylylene and formed so as to come into contact with said scintillator.

5. A scintillator panel according to claim 1, wherein said adhesive is an adhesive which absorbs light incident on said adhesive.

6. A scintillator panel according to claim 5, wherein said adhesive is an adhesive which absorbs 50% or more of light incident on said adhesive.

7. A scintillator panel according to claim 1, wherein side faces of said optical members which are not adjacent each other are provided with a light-shielding material having a light transmissivity of 50% or less.

8. A radiation image sensor comprising the scintillator panel according to claim 1, and an imaging device for capturing an optical image outputted from said exit end face of said optical member.

9. A radiation image sensor according to claim 8, further comprising a light-guiding optical component for guiding to said imaging device said optical image outputted from said exit end face of said optical member.

10. A scintillator panel comprising:
    an optical component in which a plurality of optical members, each having entrance and exit end faces substantially parallel to each other and being composed of a plurality of optical fibers arranged, are arranged such that said entrance end faces are disposed on substantially the same plane and said optical members adjacent each other are bonded with an adhesive; and a scintillator deposited on said entrance end faces arranged;

wherein at least one of said optical members adjacent each other has an optical fiber axis forming an acute angle with said entrance end face;

wherein each of said optical members adjacent each other is arranged such that said optical fibers respectively constituting each of said optical members have a gap therebetween widening from said entrance end face side to said exit end face side; and wherein each side face of said optical members adjacent each other on said entrance end face side is formed with a ground surface in which said optical members are ground against each other.

11. A method of making a scintillator panel in which a plurality of optical members, each having entrance and exit end faces substantially parallel to each other and being composed of a plurality of optical fibers arranged, are arranged such that said entrance end faces are disposed on substantially the same plane, and a scintillator is deposited on said entrance end faces arranged; said method comprising:

a processing step of processing said optical members such that an axis of said optical fibers forms an acute angle with said entrance end face;

an arrangement step of arranging each of said optical members adjacent each other such that said optical fibers respectively constituting each of said optical members have a gap therebetween widening from said entrance end face side to said exit end face side;

a forming step of forming contact surfaces on each of respective side faces of said optical members adjacent each other on said entrance end face side;

a bonding step of bonding with an adhesive said optical members adjacent each other; and a depositing step of depositing a scintillator on said entrance end faces arranged.

12. A method of making a scintillator panel according to claim 11, further comprising a polishing step of polishing said entrance end faces arranged.

13. A method of making a scintillator panel in which a plurality of optical members, each having entrance and exit end faces substantially parallel to each other and being composed of a plurality of optical fibers arranged, are arranged such that said entrance end faces are disposed on substantially the same plane, and a scintillator is deposited on said entrance end faces arranged; said method comprising:

a processing step of processing said optical members such that an axis of said optical fibers forms an acute angle with said entrance end face;

an arrangement step of arranging each of said optical members adjacent each other such that said optical fibers respectively constituting each of said optical members have a gap therebetween widening from said entrance end face side to said exit end face side;

a grinding step of grinding respective side faces of said optical members adjacent each other against each other so as to form a ground surface on each of the respective side faces of said optical members adjacent each other on said entrance end face side;

a bonding step of bonding with an adhesive said optical members adjacent each other; and a depositing step of depositing a scintillator on said entrance end faces arranged.

* * * * *